Aug. 5, 1958            B. REDMOND            2,845,707
TABLE DISPENSER FOR BUTTER AND SIMILAR PRODUCTS
Filed April 4, 1957
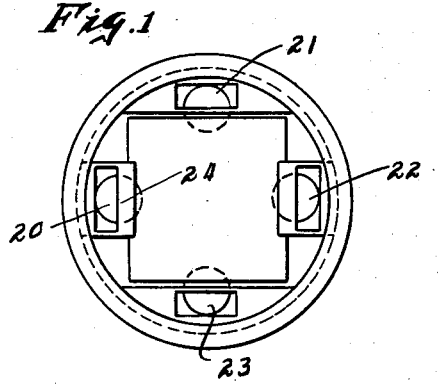
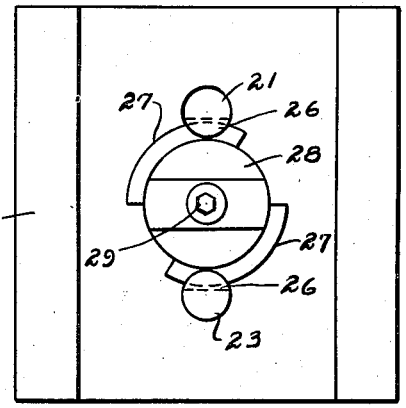
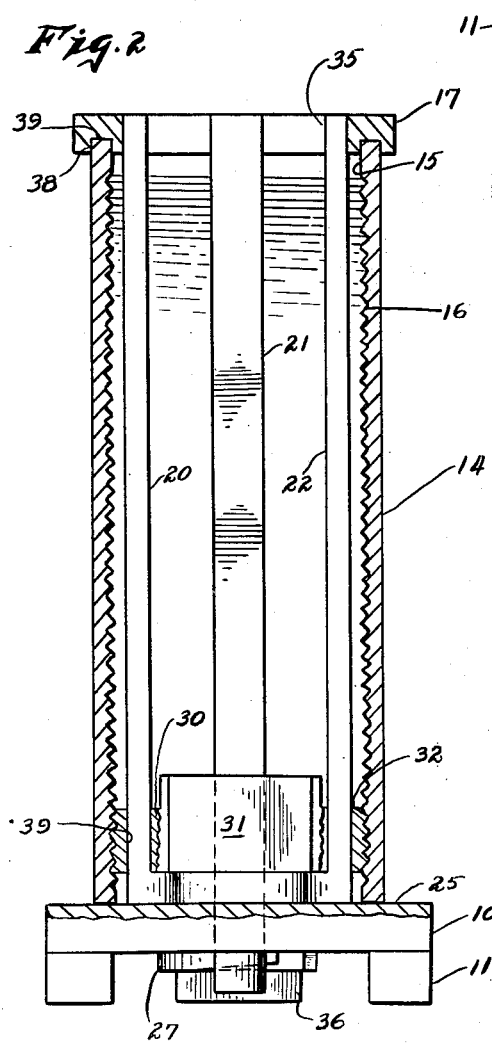
INVENTOR.
BENJAMIN REDMOND
BY
ATTORNEY

United States Patent Office 2,845,707
Patented Aug. 5, 1958

2,845,707

TABLE DISPENSER FOR BUTTER AND SIMILAR PRODUCTS

Benjamin Redmond, New York, N. Y.

Application April 4, 1957, Serial No. 650,673

3 Claims. (Cl. 31—21)

This invention relates to a table dispenser for butter or similar products. When butter is placed on a table in the ordinary butter dish or plate, considerable waste results, since there is a tendency for the individual to take more butter than is needed and to leave unused butter on the plate, which cannot be used again. Furthermore, there is a tendency to hack or mutilate the print so that considerable butter is left on the butter plate which must be discarded. In addition, where butter is placed on the table in the usual manner, a considerable amount of butter is subjected to the air and possible contamination from outside sources.

An object of this invention is to provide a butter dispenser which will not only be attractive in appearance but which will enable the user to take only as much butter as is required and which will be sanitary in its nature to prevent contamination of the butter from the air and other sources.

A further object of the invention is to provide a structure, as will be hereinafter described, which may readily be dismantled for cleaning and which may be kept sanitary. While my dispenser is designed to accommodate the conventional quarter pound print, it may, of course, be built in any size without departing from the spirit of the invention.

It will be appreciated that my dispenser may be made of any material desired but is designed to be made of molded or extruded plastic which can be readily formed to the desired shapes and which is easily cleaned and handled.

In the drawings:

Fig. 1 is a top plan view of a dispenser embodying my invention.

Fig. 2 is a side elevation in section.

Fig. 3 is a bottom plan view.

Referring more particularly to the drawings, I provide a base 10 which is supported by a pair of leg members 11 extending longitudinally on two sides of the base. Mounted on the base 10, in a manner hereinafter described, is a member 14, which may be of any desired shape but which must be cylindrical in its inner surface 15, which is provided with threads 16.

Mounted on the top of the cylindrical member 14 is a top plate 17, in which are positioned, either by molding or otherwise, four guide members, 20, 21, 22 and 23. These guide members are half round, each having a flat surface 24. At the lower end two of the guide members 20 and 22 engage a cage plate 25 while the other two guide members 21 and 23 extend through the cage plate 25 and through the base 10. The lower ends of the guide members 21 and 23 are full round and present a flange section 26 which will be engaged by the cammed flanges 27 of the locking member 28 which is pivoted at 29 by a pivot member which is countersunk in the base 10. The guide members 20, 21, 22 and 23 extend through openings 30 in the nut 31 to prevent its turning. The nut 31 is provided with external threads 32 to engage the threads 16 on the cylindrical member 14 so that when the cylindrical member 14 is turned the nut 31 will be forced upwardly in the cylinder 14.

In operation the nut 31 is lowered to its lowermost position and a quarter pound section of butter is inserted through the opening 35 between the guide members 20 to 23 inclusive. As the cylinder 14 is turned the nut member 31 is forced upwardly to force the butter through the opening 35. A slice of any desired thickness may then be cut by sliding a knife across the top plate 17 while the remainder of the butter remains covered.

When the dispenser is empty it may be readily cleaned by the turning of the handle 36 to release the guide members 21 and 23 which may then be drawn through the base. The guides and the nut may then be removed from the cylinder 14 and all parts subjected to proper cleansing. If desired the nut may be removed from the guides by turning it from a horizontal to a vertical position, although it may be cleaned in place. After cleaning the unit may be reassembled by inserting the top plate 17 on the cylinder 14 with the guides 21 and 23 extending through the base 10 and locked in place by means of the flanges 27 of the locking member 28. By turning the cylinder 14 the nut may be screwed to the lower position and is ready to receive another quarter pound print of butter, margarine or similar substance. If desired, a snap-cover, not shown, may be provided to cover the top plate 17 when in use. It will be understood that the top plate 17 engages the cylindrical member 14 at 38 loosely so that the cylinder is free to be rotated within the groove 39 of the top plate.

It will be appreciated that in this structure the print of butter or margarine or similar substance is continually covered until it is ready for use and that the guides 20 to 23 operating in the slots 39 of the nut 31 prevent the nut from turning when the cylindrical member 14 is turned to force the nut upwardly in the manner described.

I claim:

1. A dispenser for butter, margarine or the like, comprising a base, a cylindrical member having internal threads mounted for rotation on said base, a top plate freely engaging said cylindrical member, a plurality of guide members mounted in said top plate and extending to said base, a nut having external threads engaging the internal threads of said cylindrical member and having slotted portions engaging said guide members to prevent the turning of said nut, two of said guide members extending through said base and means to lock said guide members to said base.

2. A dispenser for butter, margarine or the like, comprising a base, a cylindrical member having internal threads mounted for rotation on said base, a top plate freely engaging said cylindrical member, a plurality of guide members mounted in said top plate and extending to said base, a nut having external threads engaging the internal threads of said cylindrical member and having slotted portions engaging said guide members to prevent the turning of said nut, two of said guide members extending through said base and means to lock said guide members to said base, said means comprising a pair of cam flanges on rotating member engaging slots in said guide members.

3. A dispenser for butter, margarine or the like comprising a base, a cylindrical member having internal threads mounted for rotation on said base, a top plate freely engaging said cylindrical member, a plurality of guide members mounted in said top plate and extending to said base, two of said guide members extending through said base and having slots therein engaged by a locking member, a nut having external threads engaging the internal threads of said cylindrical member and having slotted portions engaging said guide members to prevent the turning of said nut whereby the turning of said cylindrical member will force said nut upwardly on said guide members within said cylindrical member.

References Cited in the file of this patent

UNITED STATES PATENTS

| | | |
|---|---|---|
| 2,222,415 | Landwehr | Nov. 19, 1940 |
| 2,380,338 | Sherman | July 10, 1945 |
| 2,589,000 | Vani | Mar. 11, 1952 |